United States Patent [19]

Taylor

[11] 3,713,122

[45] Jan. 23, 1973

[54] SKEWED HIGH DENSITY MAGNETIC HEAD AND METHOD OF MANUFACTURING SAME

[75] Inventor: Gerald Taylor, Longmont, Colo.

[73] Assignee: International Business Machines Corp., Armonk, N.Y.

[22] Filed: June 4, 1971

[21] Appl. No.: 149,974

[52] U.S. Cl...................340/174.1 F, 179/100.2 MD

[51] Int. Cl...............................................G11b 5/28

[58] Field of Search...........179/100.2 C, 100.2 MD, 179/100.2 CA; 340/174.1 F

[56] References Cited

UNITED STATES PATENTS

| | | | |
|---|---|---|---|
| 3,221,314 | 11/1965 | Sims, Jr. | 340/174.1 F |
| 3,217,305 | 11/1965 | Hanson | 340/174.1 F |
| 3,384,880 | 5/1968 | Duinker et al. | 179/100.2 MD |
| 3,159,822 | 12/1964 | Hagopian | 340/174.1 F |
| 2,832,839 | 4/1958 | Muffly | 179/100.2 C |
| 3,474,433 | 10/1969 | Guerth | 179/100.2 MD |

*Primary Examiner*—Vincent P. Canney
*Attorney*—Hanifin and Jancin and Gunter A. Hauptman

[57] ABSTRACT

A magnetic transducer reads and writes electric signals recorded as tracks of magnetic manifestations on a magnetic medium moving relative to the transducer. The transducer is a high permeability magnetic sheet with a row of apertures along one edge of the sheet and a narrow slot connecting each aperture to the edge. Each aperture and slot corresponds to one track on the medium. An electric wire is threaded through the aperture for external connection. The edge of the sheet is adjacent the medium and at a fixed angle transverse the direction of relative motion. The angle and the thickness of the sheet determine the track width and, together with the total width of the sheet across the medium, the amount of information exchangeable with the medium.

9 Claims, 16 Drawing Figures

SKEWED HIGH DENSITY MAGNETIC HEAD AND METHOD OF MANUFACTURING SAME

CROSS-REFERENCES

The transducers may be constructed and tested in accordance with the following related applications filed on even date herewith and assigned to the International Business Machines Corporation.

Ser. No. 149,973, "Method of forming Gaps for Small Magnetic Heads," by G. W. Brock and R. Stephens;

Ser. No. 149,975, "Batch Fabricated Magnetic Head Tester and Testing Method," by S. M. Barrager and S. H. Smith; and Ser. No. 149,976, "Improved Batch Fabricated Magnetic Head Tester and Testing Method," by S. M. Barrager, G. Bate, and S. H. Smith.

BACKGROUND OF THE INVENTION

1. Field of the Invention

The invention generally relates to electronic data processing and, more particularly, to transducers permitting information expressed as electric signals to be manifested as magnetically oriented areas of a medium for subsequent retrieval.

2. Description of the Prior Art

Electrical signals are recorded by magnetic heads on magnetic media such as tapes and disks in tracks formed by relatively moving the tracks and the head. Each head has a number of read/write gaps, each gap defining a track on the medium. Normally, there is a direct relationship between the gap width and the track width. In such cases, the spacing between the gaps determines the spacing between tracks and, since the head is usually mounted perpendicular to the line of medium motion, the total width of the head (the total of gap widths and spacings) limits the number of tracks recordable with the usable portion of the medium. While magnetic medium defects have in the past limited the amount of information recordable on the medium surface, medium quality has improved to the point that efficient utilization of the medium now requires heads capable of greater recording density than before. Density may be increased by recording narrower tracks closer together. However, standard head production techniques limit the gap width and spacing practically possible.

In standard head construction, laminations of magnetic and conductive material are built up into subassemblies which are combined with windings to form single head elements. Head elements are then assembled in multi-track heads. Recent prior art shows thin film batch-fabrication of heads by combinations of deposition, etching, evaporation, etc. For example, a substrate may have magnetic areas deposited on it for each track, conductors formed on each magnetic area, appropriate insulators deposited, additional magnetic areas, etc. Among the complications introduced by these advanced techniques are variations in the characteristics of each magnetic circuit, mainly due to the separate magnetic areas deposited on the substrate. As a result, it is difficult to obtain a plurality of closely spaced uniform head elements by this technique alone and very high density packing of information tracks is not commercially practical.

Closer packing of tracks has been suggested in the prior art by skewing in-line gaps at an angle from the transverse to increase the number of head gaps and, therefore, tracks. The resultant tracks may overlap each other to achieve maximum packing. Thus, as was recognized in the prior art, a limit to the density improvement achievable is set by the gap width and spacing and the relative speed of the head and medium.

SUMMARY OF THE INVENTION

A magnetic transducer with accurately and closely spaced gaps each having an unusually small width provide unexpectedly high recording density when skewed with respect to the direction of recording motion. The invention uses a sheet of magnetic material such as permalloy or HyMu 80 either sufficiently thick to be self-supporting or deposited on a supporting substrate. The thickness ($t$) of the sheet is critical to the recorded track width. A plurality ($n$) of apertures is placed in a line along one edge W of the sheet, and a thin slot having a width ($w$) is extended from each aperture to that edge. A winding is passed through each aperture. The sheet is supported with the slotted edge adjacent the magnetic medium and at a fixed angle ($\theta$) with a line transverse to the relative motion of the sheet edge and the medium. Each slot defines a track on the medium which is $t \sin \theta$ but not less than $w$ wide. The total width of the medium used by the head is $1 \cos \theta$. Optimally, the unused portion $1 \cos \theta - nt \sin \theta$ is zero.

The foregoing and other features and advantages of the invention will be apparent from the following more particular description of preferred embodiments of the invention, as illustrated in the accompanying drawings.

DETAILED DESCRIPTION OF THE INVENTION

A transducer records information as magnetic areas on a medium by translating electrical signals into magnetic fields. The same transducer may also detect magnetic areas on a medium and translate them into electrical signals. Such transducers, commonly called magnetic read/write heads, usually operate by sensing the change in flux of a magnetic medium moving past the transducer. It is not essential that the medium move past the head, it being possible to move the head--the only requirement is that there be relative motion between the medium and the transducer to gain access to successive bits. A high bit density is considered to be 10,000 flux changes per inch (fci) and a high track density is considered to be between 500 and 2,000 tracks per inch at a high data rate of approximately 2.5 megahertz (MHz).

Magnetic Head Structure (FIGS. 1–3)

Figure 1A:
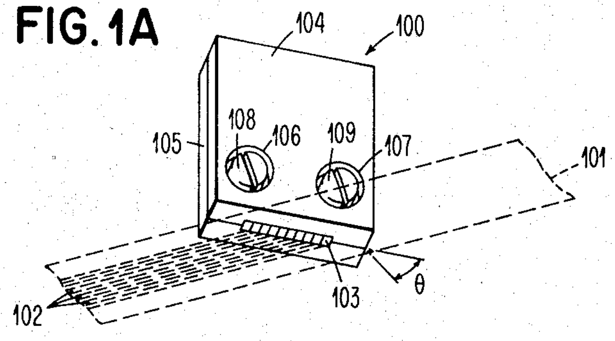
FIG. 1A shows a read/write head assembly for reading and writing information stored on a magnetic tape medium.

In order to obtain the desired high bit density, high track density and high data rate, it is desirable to operate the magnetic read/write head in a semitransverse mode. That is, the head is not necessarily mounted perpendicular to the relative motion between the head and the media. Referring first to FIG. 1A, there is shown a magnetic read/write head assembly 100 (for simplicity referred to as a magnetic head) mounted at an angle $\theta$ relative to a line across a magnetic tape 101. The magnetic head 100 is a transducer element 103 comprising a plurality of gaps each corresponding to a track 102 on the tape 101. As will be explained, the transducer element is a batch-fabricated thin film, foil strip or sheet, wherein each gap is defined by a slot, fastened between subassemblies 104 and 105 by fasteners 108 and 109 placed through fastening holes 106 and 107. As shown in more detail with reference to FIGS. 2A through 2E, the angle $\theta$ determines the number of tracks 102 which may be recorded on the magnetic tape 101 and the spacing and width of these tracks.

Figure 1B:
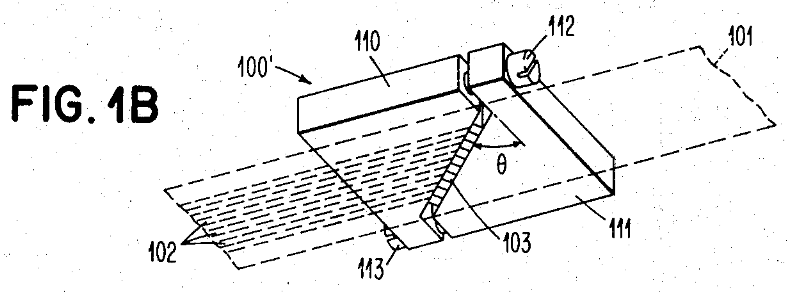
FIG. 1B shows another embodiment of a read/write head assembly for reading and writing information stored on a magnetic tape medium.
Figure 1C:
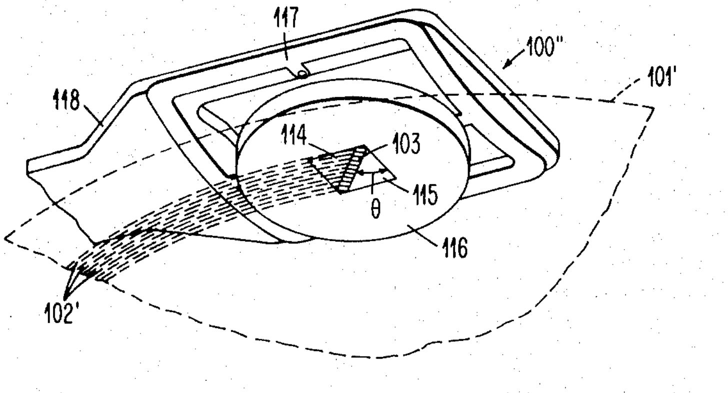
FIG. 1C shows a read/write head assembly for reading and writing information stored on a magnetic disk medium.

FIGS. 1B and 1C show two different embodiments 100' and 100'' of the magnetic head 100 of FIG. 1A. Referring first to FIG. 1B, the magnetic head 100' differs from the head 100 primarily in the subassemblies fastening the element 103 in position across the magnetic tape 101. The subassemblies 110 and 111 are held together by fasteners 112 and 113. The subassembly of FIG. 1B provides a surface with a lower profile than that of FIG. 1A. Referring now to FIG. 1C, a flying arm 118 supports the head 100'' to provide a floating structure capable of reading magnetic tracks 102' on a rotating magnetic disk 101'. The element 103 is mounted at an angle $\theta$, relative to a line through the arm 118, in a mounting comprising sections 114 and 115 centered in a holder 116 which is loaded onto the arm 118 by the spring 117.

Figure 2B:
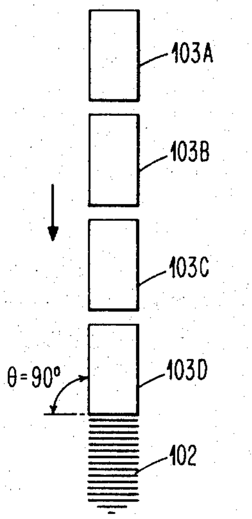
FIGS. 2A through 2E diagrammatically show the tracks on which information may be recorded by a read/write head positioned at varying angles relative to a medium.
Figure 2A:
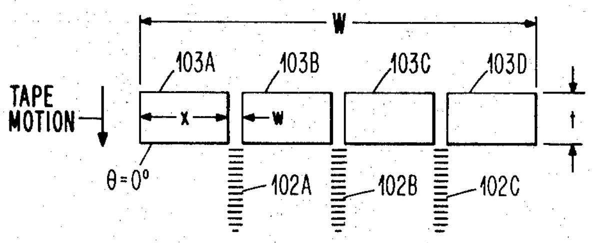
Figure 2C:
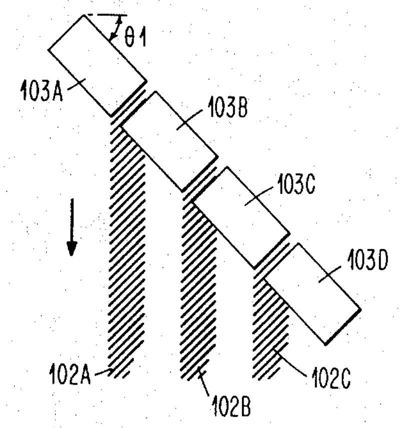
Figure 2D:
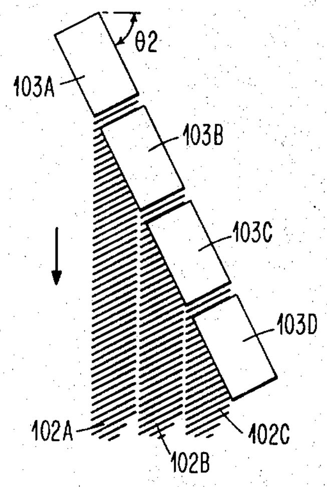
Figure 2E:
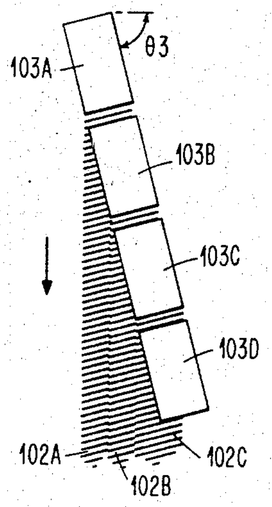

Referring now to FIGS. 2A through 2E, there are shown, in end views, details of the element 103 and the tracks 102 on the tape 101. The same details apply to tracks 102' of disk 101'. The elements 103 having a thickness $t$ consist of a number $n$ of sections, illustratively, shown as 103A through 103D and the tracks corresponding thereto are numbered 102A through 102C. It should be noted that a magnetic track designation corresponds to a gap between two elements; for example, the gap having a width $w$ between element sections 103A and 103B results in track 102A. Referring first to FIG. 2A, there is shown the standard tape head-to-magnetic-track configuration wherein the head is mounted transverse ($\theta_0$=0°) to the magnetic tape or disk motion. The tracks 102A through 102C will have a width equal to the distance $w$ between each of the head elements 103A through 103D (called "gap length" in the prior art) and a spacing equal to the cross-section $x$ of the elements 103A through 103D (called "gap width" in the prior art). Conventionally constructed prior art heads orient their gaps along axis 90° removed from the axis shown. Referring now to FIG. 2B, if the head element 103 is placed parallel to the track motion, ($\theta_{90}$=90°), the single track 102 will have a width equal to the thickness $t$ of the head element 103. (This is the gap orientation in a conventional head.) Referring to FIGS. 2C through 2E, a variety of head angles progressing from $\theta 1$ through $\theta 3$ is shown. It can be seen that as the angle increases from more than 0° toward less than 90°, the track width ($t \sin \theta$) increases and the total space between n tracks ($W \cos \theta - n\, t \sin \theta$) decreases.

FIG. 2C shows a skew angle $\theta 1$ of approximately 45° where the track width and intertrack gap are approximately equal and the recorded track is slightly less than the gap width (thickness t of the element 103). In FIG. 2D, the spacing between the tracks at $\theta 2$ is practically zero, and the track widths occupy almost the entire space upon the media available for recording and reading. If the skew angle is approximately 27.5°, the tracks become contiguous giving approximately 500 tracks per inch for an element thickness of approximately 0.002 inch and a center to center spacing of 0.004 inch. Referring to FIG. 2E, where the head angle is increased to $\theta 3$, the tracks 102A through 102C overlap.

In FIG. 2E, a skew angle of $\theta 3$=75° causes the tracks to overlap. Each of the tracks is approximately 0.001 inch wide and there are about 1,000 per inch. An increase in the skew angle can achieve up to 2,000 tracks per inch. It would be expected by one skilled in the art that if the recording gaps are displaced by 0.004 inch and the gaps are driven by high currents on the order of 1 ampere, adjacent tracks would be excited and crosstalk would occur. However, in testing the invention with alternate tracks driven at 500 and 1,000 flux changes per inch, respectively, with one ampere of write current it was observed that signals recorded on adjacent tracks were clearly defined and undisturbed.

Figure 3A:
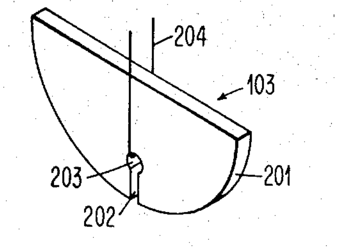
FIGS. 3A through 3C show various configurations of batch fabricated magnetic read/write head elements.
Figure 3B:
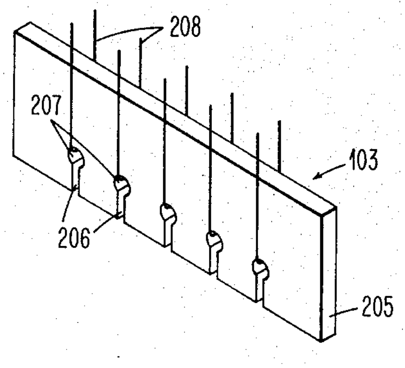
Figure 3C:
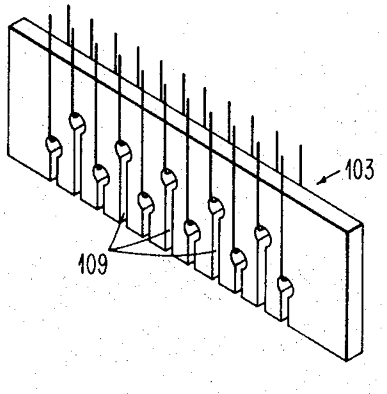

FIGS. 3A through 3C show a number of embodiments of batch fabricated elements 103 intended for mounting in transducers 100, 100' and 100'' of FIGS. 1A–1C. Referring first to FIG. 3A, a single track foil or laminated head element is shown. The material 201 is a magnetic material such as HyMu 80, Mo Permalloy or equivalent, having a thickness ranging from 0.00025 inch to 0.002 inch. The head element includes an aperture 203 having a diameter on the order of 0.0025 inch and a gap running from the aperture to the edge of the material 201 having a gap width on the order of 0.0002 inch. A winding 204 passes through the aperture 203. While a single winding 204 is shown, it is possible to loop the winding 204 through the aperture 203 any number of times desired to give greater signal strength for both recording and reading.

The concept of FIG. 3A may be extended to a plurality of parallel tracks as shown in FIG. 3B. Each of the tracks has a corresponding aperture 207 and a slot forming a gap 206 in the material 205. Windings 208 pass through each of the apertures 207 in the manner previously described with reference to FIG. 3A. Similarly, FIG. 3C shows an alternative scheme permitting closer placement of gaps with limited structural weakening of the material by the apertures. Extension of this concept to thin film technology is also possible by placing conductive and magnetic elements on a substrate, as will be explained below with reference to FIG. 4.

In the case of transverse motion, as shown in FIG. 2A, while the tracks can be made very narrow (on the order of 0.00025 inch through 0.0005 inch wide), the track pitch is limited by the thickness of the wires 208 used to drive the elements 103. Thus, for wire 0.002 inch thick, the center to center spacing is limited to 0.004 inch and 250 tracks per inch. On the other hand, as shown in FIG. 2B, the track width may be limited only by the element thickness, that is 0.001 inch through 0.002 inch, to give 500 to 1,000 tracks per inch. However, this creates the problem that all the tracks are powered in the same plane and each succeeding track therefore erases the data recorded by the preceding track. Thus, one of the positions shown in FIGS. 2C–2E will be preferable.

Figure 4:
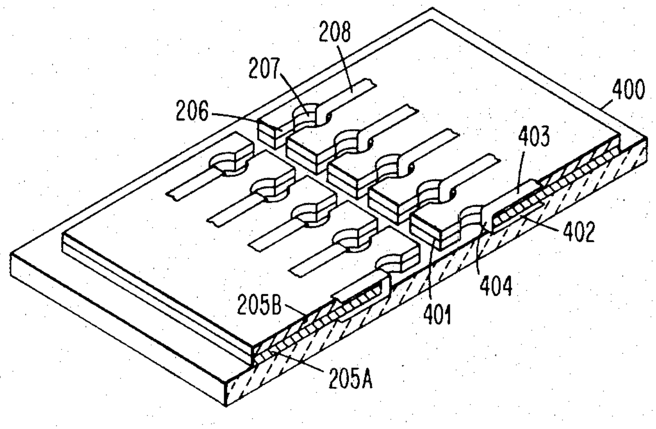
FIG. 4 is a detailed view showing construction of one embodiment of FIG. 3B.
Figures 5A, 5B:
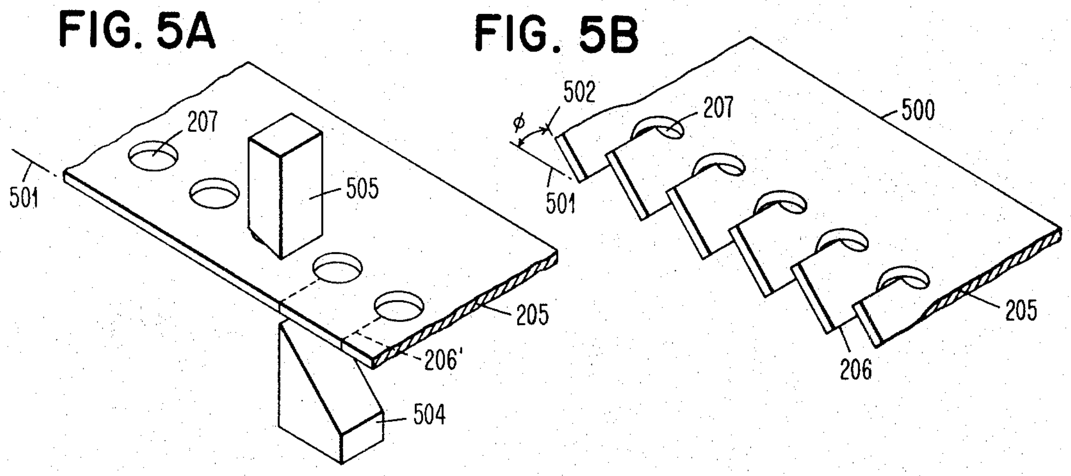
FIGS. 5A through 5C show several techniques for forming gaps in magnetic read/write head elements of the type shown in FIG. 3B.
Figure 5C:
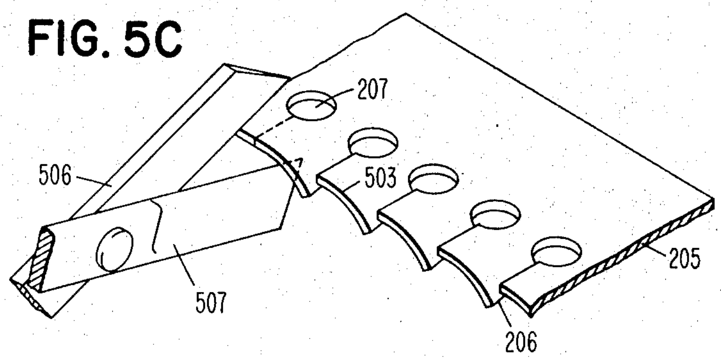
Figure 6:
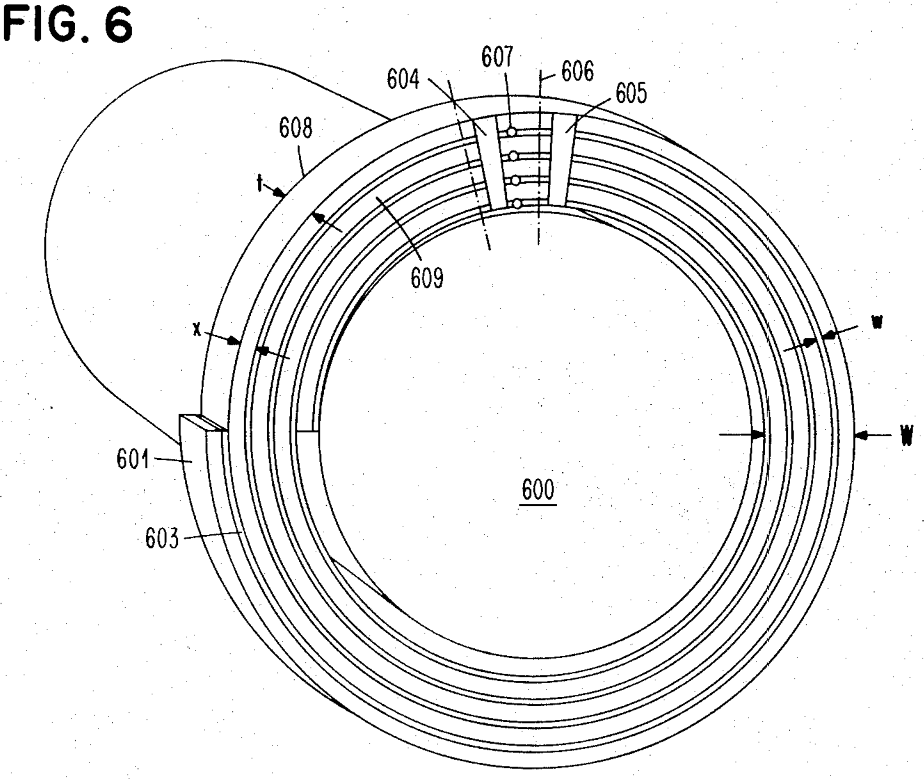
FIG. 6 shows an alternative technique for manufacturing the magnetic read/write head element of FIG. 3B.

Manufacturing Methods (FIGS. 4–6)

Magnetic head elements referred to in FIGS. 1–3 are manufactured by a number of techniques including thin film evaporation, lamination, shearing, etc. Referring to FIG. 4, thin film deposition or foil bonding techniques can form head elements of the type shown in FIG. 3B. A substrate 400 comprising an insulating material such as glass carries an insulating layer 205A and a magnetic material 205B. A winding 208 passes through apertures 207 and gaps are formed by slots 206 extending from the aperture 207 to the front surface 401 of the head element. The winding 208 is formed in three sections including a bottom section 402, a top section 403 and a center section passing through the aperture 207. The normal thin film construction steps include evaporation of the conductor 402 on the substrate 400 followed by evaporation of the insulating and magnetic layers in order. The apertures and the slots may then be etched and the conductor 404 and 403 added by appropriate masking, evaporation and etching steps. There is interposed a variety of spraying, oxidizing and glassing steps well known in the art. Prior to utilization of the head element, it is removed by shearing along a line through front surface 401. An alternative technique for manufacturing the head of FIG. 4 uses a laminated foil material, comprising insulator 205A and magnetic material 205B, and etching and deposition steps otherwise similar to those previously described.

Referring now to FIGS. 5A and 5B, an alternative technique for forming the slots 206 will be explained. The material used to form the heads may be the magnetic material 205B shown in FIG. 4 or it may comprise a sandwich 205 including an insulator and a magnetic material. In either case, the material is covered with a masking resist. The first step in the manufacture of the slots is to define a line, from the aperture 207 to the edge 501 of the material 205, along which the slots will be formed. A punch 504 and die 505 are mated along each of the lines 206′ to form the gaps 206 as shown in FIG. 5B. The successive die and punch operations skew lines 502 relative to the base line 501 at an angle $\theta$. A single punch 504 and die 505 may be used or a plurality of punches and dies may be simultaneously applied to the material 205. In each case, the surface 501 will be broken up into successive segments having an angle $\theta$ relative to the original base line 501. The material 205 is then etched to increase the ultimate slot size and smooth the slot edges. Next, the resist covering the material 205 is stripped from the part. The part 205 is then flattened, annealed and the surface is, if desired, oxidized. The end result is a stress free head element having a gap 206 which is evenly formed.

Referring now to FIG. 5C, a technique similar to the one described with reference to FIGS. 5A and 5B utilizes a scissoring action of opposed blades 506 and 507. The effect is to form a curved surface 503 as opposed to the flat surface in the technique of FIGS. 5A and 5B. The subsequent steps however, are identical to those previously described.

Alternative techniques for forming gaps and other dimensions exist. For example, a line may be scratched from the aperture to the edge and the slot etched, cut, sawed, laser, or electro-discharge machined or electron beam machined, etc. Since the material is originally covered with a resist, the etchant attacks only the scratched area. The apertures may be formed similarly or by countersinking the surface and etching or by punching the holes entirely.

Referring now to FIG. 6, still another technique for manufacturing a head element of the type shown in FIG. 3B is shown. An annealed or unannealed flat magnetic foil strip or wire 601 such as HyMu 80 or its equivalent having a thickness $t$ and cross-section $x$ is plated by evaporation or some other appropriate technique with a gap material 603, such as copper, to a width $w$. It is possible to plate a width of one-half $w$ on each side of the strip 601, though the strip is shown plated on only one side. The plated strip 601 is coiled about a mandrel 600 having a diameter d which is much larger than the wire cross-section $x$. The wound strip may then be annealed, for example at approximately 1,200° Fahrenheit, until light diffusion bonding occurs at the interface between materials 601 and 603. The face 609 of the wound strip is then appropriately masked off to permit the plating of additional magnetic material 604, 605, etc.; for example, permalloy, at successive points around the wound strip. Holes 607 are then drilled, punched, or otherwise formed by techniques known in the art (such as the use of laser beams) and the outside face is potted to permit removal of the mandrel. A wire saw or laser may then be used to cut the successive sections along lines 606, etc. from the wound strip, and the back 608 is lapped to produce the required track width. The manufacturing technique produces a magnetic head having gaps $w$ wide, with a pitch between the gaps of $x + w$ and a track width of $t$ or less.

While the invention has been particularly shown and described with reference to preferred embodiments thereof, it will be understood by those skilled in the art that various changes in form and details may be made therein without departing from the spirit and scope of the invention.

What is claimed is:

1. In combination, a magnetic read/write transducer for accessing information readable and recordable by relative motion between the transducer and a magnetic medium having a plurality of closely-spaced information indicative tracks, comprising:

- a fixture, for holding a number of transducer elements, each having an edge in a fixed nontransverse orientation with respect to the relative motion of the transducer and that portion of the medium carrying information tracks;
- a number of transducer elements, held in said fixture, each including a relatively thin magnetic sheet having a thickness greater than the width of an information track;
- slots formed in the sheet, one for each information track, extending from the element edge a predetermined distance to an inner point, to provide a magnetic gap defined by the sheet thickness; and
- electrically conductive means, forming a single turn winding, associated with said sheet at each of the inner points of each slot, the conductive means being wider than the slot, to transduce magnetic and electrical forms of information.

2. The transducer of claim 1, wherein the slots are narrower than the sheet thickness.

3. In combination, a high density multi-channel magnetic head capable of accessing a plurality of closely-spaced information tracks on a portion of a magnetic recording medium, comprising:

- a high permeability magnetic sheet, wider than the portion of the recording medium utilized for information tracks and thicker than the breadth of any information track;
- a plurality of apertures in said sheet, positioned to each correspond with a different track;
- a plurality of slots formed in said sheet, each extending from a different aperture to the same edge of the sheet and each narrower than the associated aperture;
- support means, fixing the sheet across the recording medium, with aforesaid edge adjacent and parallel to the medium surface and at an angle to a line transversely across the information track portion of the medium, to provide access to all the information tracks defining the utilized portion of the medium; and
- conductive means defining a single winding turn, associated with each aperture, for providing electrical access to the information magnetically recorded on the medium.

4. The head of claim 3, wherein the sheet has a width W and thickness $t$ and is fixed at an angle $\theta$, the portion of the medium utilized for information tracks having a width $W \cos \theta$ and each track having a width $t \sin \theta$.

5. The head of claim 4, wherein the head width, thickness, and angle and the number $n$ of slots are chosen to make the expression $W \cos \theta - nt \sin \theta$ essentially equal to or less than zero.

6. A high density magnetic recording and reading head, comprising the combination of:

- a sheet of high-permeability magnetic material of thickness t having a plurality of apertures and slots in the sheet wider than the apertures connecting the apertures to one edge of the sheet; and
- a mount, supporting the aforesaid edge of the sheet at an angle $\theta$ from a reference line, relative motion between said edge and an information bearing portion of a medium placed along said reference line defining a track, for each of $n$ slots, having a width $t \sin \theta$.

7. The head of claim 6, wherein the angle $\theta$ is in the range from more than 0° to less than 90°.

8. The head of claim 6, wherein the sum of the widths $n\ t \sin \theta$ of all the tracks defined by said head substantially equals the amount of space across said medium allotted for recording.

9. A method of fabricating a high density magnetic read/write head from a high-permeability sheet comprising the steps of:

- placing a plurality of apertures in said sheet along a line a predetermined distance from one edge of the sheet;
- forming a plurality of slots narrower than said apertures in said sheet, each extending from a different one of the apertures to said edge;
- associating with each aperture a single conductive material; and
- mechanically fixing the sheet at a predetermined angle, greater than 0° and less than 90°, with respect to the direction of relative motion between the head and an information bearing portion of a recording surface.

* * * * *